Patented May 30, 1950

2,509,875

UNITED STATES PATENT OFFICE 2,509,875

ALKALI SILICATE COATING COMPOSITION

Alexander McDonald, Gordon, near Sydney, New South Wales, Australia, assignor to Industrial Metal Protectives, Inc., Wilmington, Del., a corporation of Delaware No Drawing. Application November 14, 1946, Serial No. 709,770. In Australia January 17, 1946

13 Claims. (Cl. 106—84)

This invention relates to improvements in coating compositions designed to form protective coatings on metal and other surfaces, and more particularly to such compositions employing sodium silicate and finely divided metals such as zinc and aluminum or alloys thereof.

It is known to prepare coating compositions from commercial grades of sodium silicate and metal dust, in particular zinc dust, the proportion of sodium oxide ($Na_2O$) to silica ($SiO_2$) in one grade which has been practically used being 1 mole of sodium oxide to 2 moles of silica. It is also known to render these coatings insoluble by applying heat thereto.

The grade of sodium silicate referred to above is very alkaline and, when used as a vehicle for zinc dust, quickly attacks the zinc after being mixed, evolving hydrogen, the time of commencement of attack varying considerably with temperature, and, further, requires a high temperature to render it insoluble. It is noticeable that when applied to plates of thick section it is more easily affected by moisture condensed from furnace gases (used in heating the surface to produce substantial insolubility) than is the case when a sodium silicate containing a greater proportion of $SiO_2$ is employed. It also gives a considerable efflorescence of sodium carbonate when exposed to the air. This efflorescence probably also contains basic zinc carbonate.

Sodium silicate of higher $SiO_2$ content than 1:2 when used as a vehicle gives a much harder coat at a lower baking temperature but tends to crack where applied thickly.

It is an object of this invention to provide a coating composition of the sodium silicate, metal dust type which will overcome the above mentioned drawbacks.

It is another object of this invention to provide a coating composition of the sodium silicate, metal dust type which can easily be applied to metal or other surfaces and which will firmly adhere so as to protect such surfaces from corrosion.

Another object of this invention consists in the provision of a sodium silicate metal dust composition, which will allow to apply the coating to metal to be coated and thereafter to bend said metal without affecting the coating.

It is a further object of this invention to provide a method of coating metal and other surfaces with a protective coating which will cause the coating firmly to adhere to the surface to be protected against corrosion.

These and other objects and advantages of the invention will appear more clearly from the following description setting forth the invention in detail.

A coating composition according to the present invention comprises a mixture of metal dust and sodium silicate, the composition of the sodium silicate being such that the ratio of sodium oxide to silica defined in moles is approximately 1:2.6.

In practice the two commercial grades of sodium silicate, in which the ratio of sodium oxide to silica is 1:2 in the one case and 1:3.3 in the other, are preferably both separately made up to a specific gravity of 1.3. However, if desired, the silicate having the desired ratio of $Na_2O$ to $SiO_2$ may be prepared in any other convenient way. These two liquids are then mixed in equal proportions to give the desired sodium silicate solution. The pH value of this liquid is approximately 11.0 but liquids have been used having a pH value of 11.3 to 10.8, which corresponds to ratio of $Na_2O$ to $SiO_2$ of 1:2.3 to 1:3.0. The higher the ratio, the greater the tendency to crack with thick coats, while the lower the ratio the greater is the initial water solubility and higher baking temperature required.

The silicate solution may be diluted to a specific gravity of 1.26 to give a vehicle for a slower drying coat for field work in hot dry winds. A coating composition made from a silicate solution so diluted is also advantageous for spraying purposes. When a silicate solution is used which has a specific gravity lower than 1.26, a much thinner coat results.

A satisfactory mix is obtained by employing 30 ml. of sodium silicate of the above described composition with 100 grammes of very fine zinc dust. This mix requires baking to 250° F. to attain insolubility. Ammonia or a fatty acid may be added to facilitate spreading and adhesion.

It has been found that the addition of certain lead compounds, notably red lead, delays the attack by the alkali on the zinc. This attack results in the formation of sodium zincate, a compound which causes gelation of the silica and consequent cracking of the film. The addition of small amounts of red lead thus enables mixes to be kept for longer periods under adverse conditions. Such coatings have given good performance in sea water.

I have also found that certain lead compounds, notably lead chromate, will render the coating insoluble without application of any appreciable degree of heat. The lead chromate may be used as a dry powder or as a paste containing 50% by weight of water. All proportions of lead chromate stated hereafter are on the wet basis. Litharge and white lead have also been used for this purpose but are not as satisfactory as lead chromate. Under normal conditions the setting takes place in 3 to 6 days, but in cold damp weather may take from 2 to 3 weeks, while in direct sunlight it may take less than 48 hours. The percentage of lead chromate used ranges from 1 to 10% by weight. If more than 10% by weight of lead chromate is used, the mix thickens rapidly and, when applied, tends to crack. A mixture which has proven to be particularly advantageous is 5% by weight lead chromate and 5% by weight red lead, the red lead giving added salt water resistance and increasing the antifouling properties of the coat without the adverse effects of thickening and cracking noticed when 10% by weight of the chromate alone is used.

Whilst reference has been made to the incorporation of lead compounds for improving the antifouling properties of the coating, the antifouling properties also may be similarly improved by the incorporation of other antifouling agents of which arsenic oxide is an example.

Where the lead compounds are used in the coating compositions, they may be thoroughly mixed with the silicate solution before the addition of the zinc. The zinc dust must then be added to the mixture before the lead compounds cause gelation. It has also been found possible to mix the dry powdered lead compounds with the zinc dust and then to add the silicate solution.

Portland cement may be mixed with the zinc dust in proportions up to 10% by weight of the mix. This gives a quick setting coat but the mixture does not keep. 5% by weight Portland cement and 5% by weight litharge may be used with advantage.

A further improvement of the new composition set forth above can be obtained by using metal dust, the average particle size of which is not larger than 3 microns.

*Example I*

A simple mix which has proved satisfactory is:

Sodium silicate of ratio $Na_2O:SiO_2$
 of 1:2.6 defined in moles _____ milliliters__ 30
Zinc dust _____ grammes__ 100

*Example II*

Another typical mix used in practice is:

Red lead _____ ozs__ 8
Lead chromate _____ ozs__ 4
Sodium silicate of ratio $NaO:SiO_2$
 of 1:2.6 defined in moles _____ pts__ 6
Mix thoroughly and add:
Superfine zinc powder _____ lbs__ 21

This mixture will yield approximately one gallon of the coating composition according to the invention.

The mix is brushed or sprayed onto the surface to be protected, and is allowed to dry for 2 hours. It is then raised, preferably in a substantially moisture-free atmosphere, to a temperature of 200–300° F.

It is important that for thick iron sections the baking operation should take place in a moisture-free atmosphere. In the case of thin iron sections, this condition is not so important, however.

If, in the above mentioned example, zinc dust is used having a particle size larger than 3 microns, say for instance 6 microns, satisfactory results can still be obtained with the ratio of $Na_2O:SiO_2$ of from 1:2.3 to 1:3.0 if the quantity of the zinc dust in the mixture is increased.

In this connection a mixture of the following constitution and in the following proportions may be used:

*Example III*

Red lead _____ grammes__ 7
Lead chromate _____ do____ 5
Zinc dust _____ do____ 163
Sodium silicate having the ratio of
 $Na_2O:SiO_2$ of from 1:2.3 to 1:3.0
 defined in moles _____ milliliters__ 31

A particularly advantageous composition will be obtained when of the metal dust, having an average particle size of not more than 3 microns, at least 90 per cent is capable of passing through a 400 mesh Tyler sieve. A composition made up with such metal dust is distinguished by an especially great adhesion and will allow bending of the coating article to a greater degree than has heretofore been possible without destroying or affecting the coating.

While the compositions have been described above in connection with sodium silicate, it has been found that satisfactory results will also be obtained when replacing some or all of the sodium silicate by potassium silicate.

While in the above mentioned Examples II and III the percentage of lead chromate is given with the understanding that the lead chromate is in the form of dry powder, it is of course understood that, if desired, lead chromate may also be used as a paste containing 50 per cent by weight of water. In this last mentioned instance twice the weight will be required.

A protective coating against sulphuric acid may be provided for steel by first coating the steel with a sodium silicate zinc dust composition according to this invention and subsequently superimposing another coating comprising a composition of sodium silicate and lead dust upon the said first coating.

It has also been found that a coating according to the invention will especially firmly adhere to a surface to be coated when this surface is subjected first to a treatment with an acid bath, whereupon the surface is thoroughly washed to remove all acid residues, and then this surface is subjected to sand blasting.

I am well aware that the application of an acid bath to a surface to be cleaned for de-scaling purposes is known per se, and I am also aware that sand blasting has been applied for de-scaling purposes. However, up to now, both methods would not be sequentially applied to a surface to be treated. Even if both methods are sequentially applied to a surface to be coated with a protective coat, iron salt deposits produced by the acid bath have sometimes withstood this treatment and, after the coating was applied have caused early corrosion. It has been found according to the present invention that the above mentioned difficulties can be overcome by treating the surface with an alkali such as lime water which precipitates both the iron and acid radicals to give inert compounds which do not stimulate corrosion. This alkali treatment is applied preferably immediately after the washing off of the acid residues.

The term "zinc" or "aluminum" in the claims includes alloys of zinc or aluminum.

It is of course understood that the present invention is by no means limited to the specific examples set forth above, but also comprises any modifications within the scope of the appended claims.

Having thus fully described my invention, what I claim as new and desire to secure by Letters Patent is:

1. A liquid coating composition comprising a dispersion of zinc dust, the average particle size of which is not larger than 6 microns and having an average particle size of 3 microns in an aqueous solution of an alkali metal silicate of the class consisting of potassium silicate and sodium silicate, the ratio of alkali metal oxide defined in moles being 1:2.0 to 1:3.0.

2. A liquid coating composition comprising a dispersion of zinc dust, the average particle size of which is not larger than 6 microns and having an average particle size of 3 microns in an aqueous solution of an alkali metal silicate of the class consisting of potassium silicate and sodium silicate, the ratio of alkali metal oxide defined in moles being 1:2.0 to 1:3.0, the proportion of alkali metal silicate to zinc dust varying between 25%:75% to 29%:71% by weight.

3. A liquid coating composition comprising a dispersion of zinc dust, the average particle size of which is 3 microns, at least 90% of which is capable of passing through a 400 mesh Tyler sieve in an aqueous solution of an alkali metal silicate of the class consisting of potassium silicate and sodium silicate, the ratio of alkali metal oxide to silica defined in moles being 1:2.4 to 1:3.0, said coating composition also including up to 10% of a lead compound selected from the group consisting of lead chromate, white lead, red lead and litharge.

4. A liquid coating composition comprising finely divided zinc dust, the average particle size of which is not over about six microns, said coating composition also including an aqueous solution of an alkali metal silicate of the class consisting of potassium silicate and sodium silicate, the ratio of alkali metal oxide to silica defined in moles being 1:2.4 to 1:3.0, the proportion of alkali metal silicate to zinc dust varying between 25%:75% to 29%:71% by weight, said coating composition also including up to 10% of a lead compound selected from the group consisting of lead chromate, white lead, red lead and litharge.

5. A liquid coating composition comprising a dispersion of zinc dust having an average particle size of about 3 microns, at least 90% of which is capable of passing through a 400 mesh Tyler sieve, in an aqueous solution of an alkali metal silicate of the class consisting of potassium silicate and sodium silicate, the ratio of alkali metal oxide to silica defined in moles being 1:2.0 to 1:3.0.

6. A liquid coating composition comprising a dispersion of zinc dust the average particle size of which is not larger than 6 microns and having an average particle size of 3 microns, at least 90% of which is capable of passing through a 400 Tyler mesh sieve, in an aqueous solution of an alkali metal silicate of the class consisting of potassium silicate and sodium silicate, the ratio of alkali metal oxide to silica defined in moles being 1:2.0 to 1:3.0.

7. A liquid coating composition comprising a dispersion of zinc dust having a particle size of about 3 microns, at least 90% of which is capable of passing through a 400 Tyler mesh sieve, in an aqueous solution of an alkali metal silicate of the class consisting of potassium silicate and sodium silicate, the ratio of alkali metal oxide to silica defined in moles being 1:2.0 to 1:3.0, the proportion of alkali metal silicate to zinc dust varying between 25%:75% to 29%:71% by weight.

8. A liquid coating composition comprising a dispersion of zinc dust the average particle size of which is not larger than 6 microns and having an average particle size of 3 microns, at least 90% of which is capable of passing through a 400 Tyler mesh sieve, in an aqueous solution of an alkali metal silicate of the class consisting of potassium silicate and sodium silicate, the ratio of alkali metal oxide to silica defined in moles being 1:2.0 to 1:3.0, the proportion of alkali metal silicate to zinc dust varying between 25%:75% to 29%:71% by weight.

9. A liquid coating composition comprising a dispersion of zinc dust, the average particle size of which is not larger than 3 microns, in an aqueous solution of an alkali metal silicate of the class consisting of potassium silicate and sodium silicate, the ratio of alkali metal oxide to silica defined in moles being 1:2.6, the alkali metal silicate solution being in an amount of about 30 milliliters to 100 grams of the zinc dust.

10. A liquid coating composition comprising a dispersion of zinc dust, the average particle size of which is not larger than 3 microns, in an aqueous solution of sodium silicate, the ratio of sodium oxide to silica defined in moles being 1:2.6 said mixture containing red lead and lead chromate in about the following proportions:

| | |
|---|---|
| Red lead_____ounces__ | 8 |
| Lead chromate_____ounces__ | 4 |
| Sodium silicate solution of ratio $Na_2O:SiO_2$ of 1.26 _____pts__ | 6 |
| Superfine zinc dust_____pounds__ | 21 |

11. A liquid coating composition comprising a dispersion of zinc dust, the average particle size of which is not over 3 microns, in an aqueous solution of sodium silicate, red lead and lead chromate, the proportions being substantially as follows:

| | |
|---|---|
| Red lead_____grammes__ | 7 |
| Lead chromate_____do____ | 5 |
| Zinc dust_____do____ | 163 |
| Sodium silicate having the ratio solution of $Na_2O:SiO_2$ of from 1:2.3 to 1:3.0 milliliters__ | 31 |

12. A liquid coating composition comprising a dispersion of zinc dust having an average particle size of 6 microns, in an aqueous solution of alkali metal silicate, of the class consisting of potassium silicate and sodium silicate, red lead and lead chromate.

13. A liquid coating composition comprising a dispersion of zinc dust, the average particle size of which is not larger than 3 microns, in an aqueous solution of sodium silicate, said sodium silicate having a ratio of sodium oxide to silica, defined in moles, of 1:2.6, in the approximate proportions of 100 grammes of zinc dust to 30 milliliters of sodium silicate.

ALEXANDER McDONALD.

REFERENCES CITED

The following references are of record in the file of this patent:

UNITED STATES PATENTS

| Number | Name | Date |
|---|---|---|
| 218,830 | Peckham | Aug. 26, 1879 |
| 346,841 | Chormann | Aug. 3, 1886 |
| 459,751 | Hooker | Sept. 22, 1891 |
| 1,110,808 | Basile | Sept. 15, 1914 |
| 1,187,746 | Kirschenbauer | June 20, 1916 |
| 1,452,445 | Leidman | Apr. 17, 1923 |
| 1,837,614 | Gramberg | Dec. 22, 1931 |
| 2,176,597 | Sweeney | Oct. 17, 1939 |
| 2,462,763 | Nightingall | Feb. 22, 1949 |

FOREIGN PATENTS

| Number | Country | Date |
|---|---|---|
| 6,755 | Great Britain | 1907 |
| 15,131/28 | Australia | 1929 |
| 104,231 | Australia | 1938 |